(12) United States Patent
Wang

(10) Patent No.: US 10,189,206 B2
(45) Date of Patent: Jan. 29, 2019

(54) APPARATUS AND METHODS FOR REPAIRING DISCREPANT WELDS

(71) Applicant: Pei-Chung Wang, Troy, MI (US)

(72) Inventor: Pei-Chung Wang, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 904 days.

(21) Appl. No.: 14/476,263

(22) Filed: Sep. 3, 2014

(65) Prior Publication Data

US 2015/0068663 A1 Mar. 12, 2015

Related U.S. Application Data

(60) Provisional application No. 61/874,397, filed on Sep. 6, 2013.

(51) Int. Cl.
*B29C 65/00* (2006.01)
*B29C 35/00* (2006.01)
(Continued)

(52) U.S. Cl.
CPC .......... *B29C 65/08* (2013.01); *B29C 35/0261* (2013.01); *B29C 66/1122* (2013.01);
(Continued)

(58) Field of Classification Search
CPC ......... B29C 65/00; B29C 65/08; B29C 35/00; B29C 35/02; B29C 35/02; B29C 35/026; B29C 35/026; B29C 35/0261; B29C 66/00; B29C 66/10; B29C 66/11; B29C 66/11; B29C 66/112; B29C 66/112; B29C 66/1122; B29C 66/20; B29C 66/21; B29C 66/30; B29C 66/30; B29C 66/302; B29C 66/302; B29C 66/3022; B29C 66/40; B29C 66/41; B29C 66/70; B29C 66/73; B29C 66/73; B29C 66/739; B29C 66/739; B29C 66/7392; B29C 66/80; B29C 66/81;
(Continued)

(56) References Cited

U.S. PATENT DOCUMENTS 3,577,292 A * 5/1971 Obeda ............... B29C 65/08 156/73.1
6,199,745 B1 * 3/2001 Campbell ............ B23K 20/123 228/112.1

(Continued)

OTHER PUBLICATIONS

Office Action in related German Application No. 102014112679.3 dated Jan. 31, 2018.

*Primary Examiner* — Jacob T Minskey
*Assistant Examiner* — Matthew Hoover
(74) *Attorney, Agent, or Firm* — Tiffany N. Logan; Parks IP Law LLC

(57) ABSTRACT

A custom weld-repair tool, for use in repairing a discrepant weld between workpieces, including an extended portion and a cavity adjacent the extended portions. The discrepant weld includes an insufficient primary portion and the tool is configured to, when the extended portion is in contact with a proximate one of the workpieces, channel welding energy, received at or generated at the tool, to the proximate workpiece via the extended portion, to form or enlarge a weld at a periphery of the primary portion or directly adjacent the primary portion.

15 Claims, 4 Drawing Sheets

(51) Int. Cl.

| | | |
|---|---|---|
| *B29C 73/00* | (2006.01) | |
| *B29C 65/08* | (2006.01) | |
| *B29C 73/30* | (2006.01) | |
| *B29C 73/34* | (2006.01) | |
| *B29C 35/02* | (2006.01) | |
| *B29K 101/12* | (2006.01) | |
| *B29K 105/00* | (2006.01) | |
| *B29L 31/30* | (2006.01) | |

(52) U.S. Cl.
CPC .......... *B29C 66/21* (2013.01); *B29C 66/3022* (2013.01); *B29C 66/41* (2013.01); *B29C 66/7392* (2013.01); *B29C 66/81* (2013.01); *B29C 66/81431* (2013.01); *B29C 66/8322* (2013.01); *B29C 73/30* (2013.01); *B29C 73/34* (2013.01); *B29C 66/71* (2013.01); *B29C 66/712* (2013.01); *B29C 66/721* (2013.01); *B29C 66/7422* (2013.01); *B29C 66/74283* (2013.01); *B29C 66/8227* (2013.01); *B29K 2101/12* (2013.01); *B29K 2105/253* (2013.01); *B29L 2031/3002* (2013.01)

(58) Field of Classification Search
CPC ..... B29C 66/81; B29C 66/814; B29C 66/814; B29C 66/8143; B29C 66/8143; B29C 66/81431; B29C 66/83; B29C 66/83; B29C 66/832; B29C 66/832; B29C 66/8322; B29C 66/8322; B29C 73/00; B29C 73/30; B29C 73/34

See application file for complete search history.

(56) References Cited

U.S. PATENT DOCUMENTS

| | | | |
|---|---|---|---|
| 6,519,500 B1* | 2/2003 | White | G05B 19/00 156/73.1 |
| 8,360,300 B1* | 1/2013 | Strotmann | B23K 20/106 228/1.1 |
| 2003/0192863 A1* | 10/2003 | Wang | B23K 11/11 219/117.1 |
| 2011/0108181 A1* | 5/2011 | Cai | B23K 20/10 156/64 |

* cited by examiner

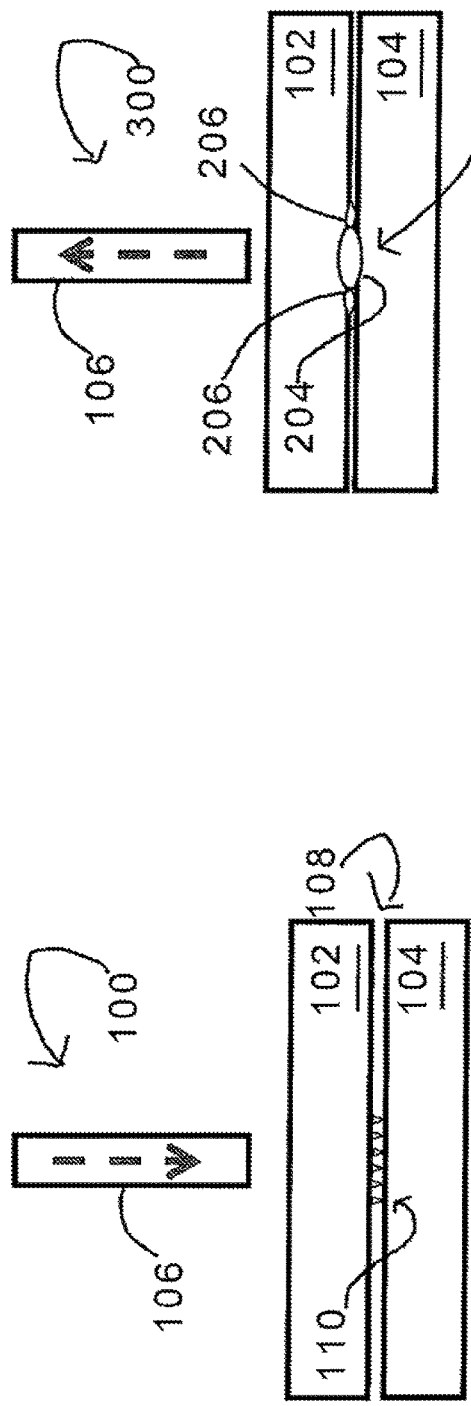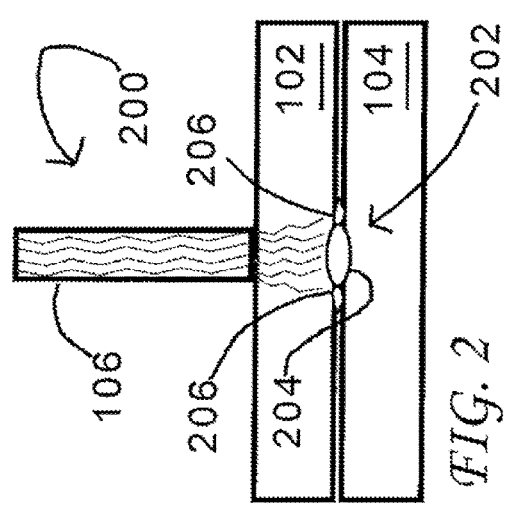

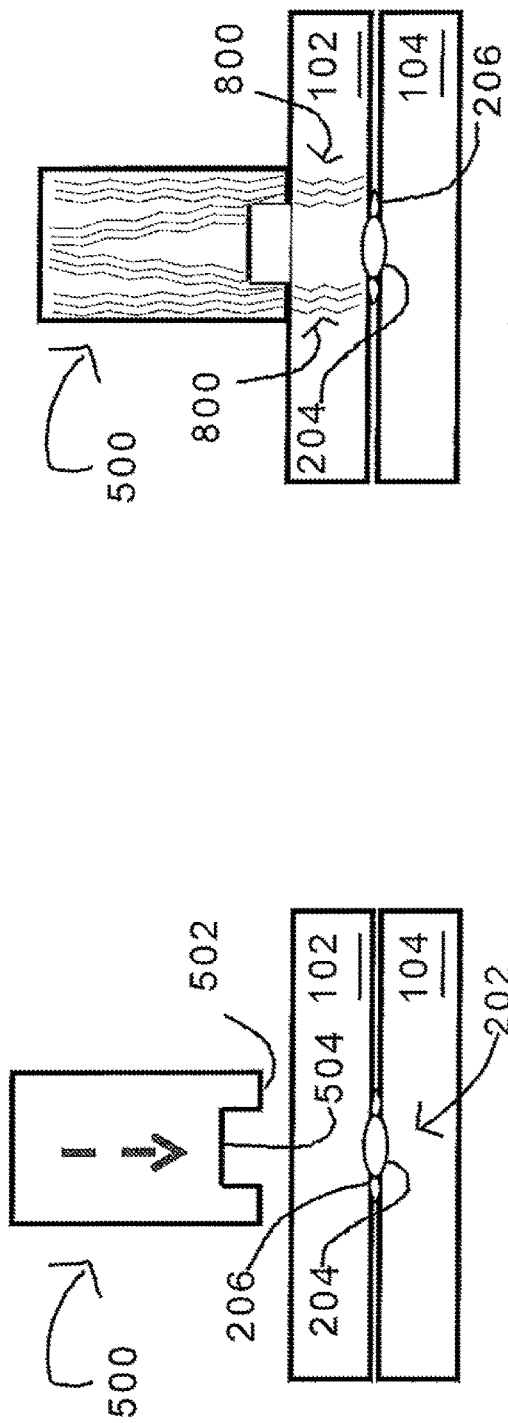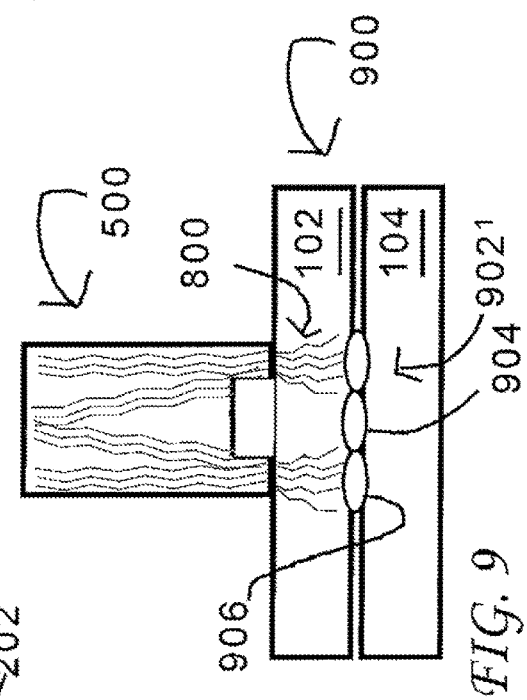

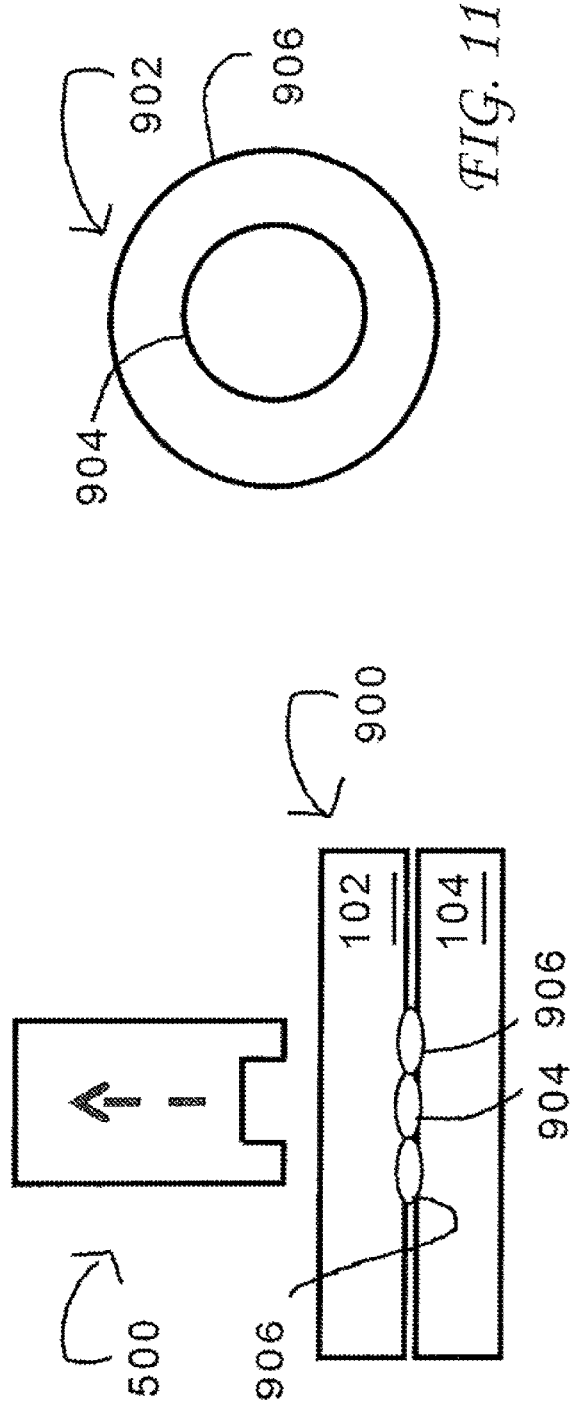
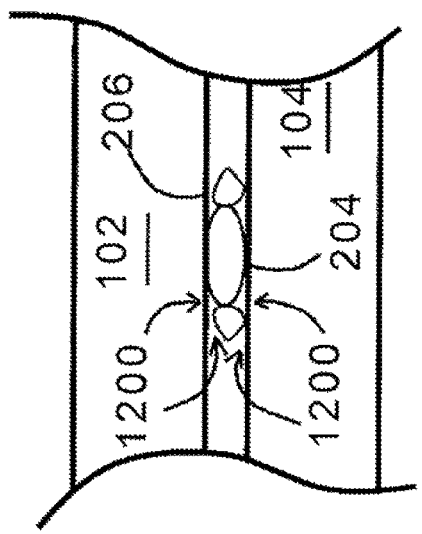

APPARATUS AND METHODS FOR REPAIRING DISCREPANT WELDS

TECHNICAL FIELD

The present disclosure relates generally to joining workpieces and, more particularly, to apparatus and methods for repairing flawed or discrepant welds created between two workpieces wherein at least one includes a polymeric composite.

BACKGROUND

In automotive manufacturing, polymeric composites are being used increasingly due to their favorable characteristics, including being lightweight, highly-conformable or shapeable, strong, and durable. Some composites are further colorable and can be finished to have most any desired texture.

The increased use in automobiles includes, for instance, in instrument and door panels, lamps, air ducts, steering wheels, upholstery, truck beds or other vehicle storage compartments, upholstery, external parts, and even engine components. Regarding engine components, and other under-the-hood (or, UTH) applications, for instance, polymers are configured, and being developed continuously, that can withstand a hot and/or chemically aggressive environment. Regarding external parts, such as fenders, polymers are being developed that are online paintability and have high heat and chemical resistance over longer periods of time. And many other potential usages in automotive applications are being considered continuously.

With this trend, finding ways to efficiently and effectively join polymer components is becoming progressively important. Compression molding and post-mold joining techniques—e.g., ultrasonic welding—are being used more commonly.

In ultrasonic welding, two workpieces are joined, wherein one or both includes a polymeric composite. With reference to the figures, and more particularly the first figure, FIG. 1 shows schematically a conventional ultrasonic welding arrangement including two workpieces 102, 104 to be welded together, and a welding tool 106, such as an ultrasonic welding horn.

For ultrasonic welding, the workpieces 102, 104 are held together, putting them under pressure, while ultrasonic vibrations are applied to pieces—e.g., to a top workpiece of the two.

To direct energy to an interface 108 between the workpieces 102, 104, energy directors 110 are sometimes positioned between the workpieces 102, 104, or formed in one or both workpieces so that they are positioned between the pieces during welding.

Generally, when ultrasonic energy is transmitted through the workpieces 102, 104, being under pressure, the energy over time may concentrate at an apex of the energy director(s) 110 resulting in a rapid buildup of heat. This causes the director to melt. The molten material flows across the joint interface forming a molecular bond with the mating surface.

Regarding director formation and placement, in a common case, protruding energy directors are formed when compression molding one of the workpieces using recesses in the mold. The directors extend between the workpieces 102, 104, forming a path for welding energy (e.g., ultrasonic vibrations), transmitted to the proximate workpiece 102 to propagate to the area of the interface 108 between the pieces and toward the distal piece 104.

The vibrations create frictional heat, initially at faying interfaces (i.e., tool-to-workpiece, workpiece-to-workpiece), and then intermocular friction in the composite material, causing the material to melt. When the melting occurs at the interface 108, such as due to the vibrations transmitting to the energy directors 110, the workpieces are joined there by molecular bonds (e.g., fusion or covalent bonds) of the molten material.

Sometimes, flawed, or discrepant welds are formed. A discrepant weld, generally, is any weld differing undesirably from a target weld configuration. A common flaw is that a weld is undersized, or otherwise less robust than desired. In one scenario, in which under a given sheet gage it is desired to have welds measuring about 7 mm, or more, in width, discrepant welds can have widths between about 0 mm and about 4 mm.

FIG. 2 shows the workpieces 102, 104 receiving welding energy (e.g., high-frequency (HF) acoustic vibrations) to be joined, but in an undesirable manner, forming a discrepant weld 202. The weld 202 is flawed, having an insufficient primary portion 204. The weld region or zone 202 in this example also includes insufficient ancillary welding 206. FIG. 3 shows the weld horn 106 being withdrawn from the newly, insufficiently, joined pieces 102, 104.

FIG. 4 shows an example scenario 400 in which a sufficient, desired, weld 402 is formed. Welds lacking desired quality can be referred to as discrepant, as described above.

The ancillary welding 206 can be referred to as squeeze out because it is likely cooled molten material pushed aside from the primary portion 204 under the pressure pushing the workpieces 102, 104 together during welding. Generally, the higher the amount of heat generated in forming the primary weld portion 204, the greater the amount of squeeze out.

An attempt to re-weld the existing discrepant weld 202, using the same tooling and process, would be ineffective at least because the workpiece 102 has likely been changed (joined to the workpiece 104) so that it will not generate sufficient frictional heat at the faying interfaces again for welding in response to the vibrations. More particularly, the workpiece structure, especially at a surface or perimeter of the previously-welded zone, would have been changed during the first welding to being too constraint to generate sufficient welding heat again.

Attempting to repair a weld by adding additional welds around the discrepant weld 202 is not practical due to limited space, material, time, and energy. It would be space, time, material, and energy consuming to form the extra new welds around the discrepant weld 202.

An undesirable alternative is to scrap the workpieces 102, 104 having the discrepant weld 202. Hypothetically, some of the workpieces improperly joined could also be recycled, somehow, but this process also takes resources and does not cure the challenge of avoiding undesired discrepant welds.

Yet another alternative is conventional mechanical fastening of the workpieces 102, 104 together instead of welding, or after a partial weld has been identified. The workpieces 102, 104 can be screwed together, or connected by nuts and bolts, for instance. These connections have shortcomings including unwanted added weight, unsightly exposed portions of the fasteners, more time than desired, and possibly less-robust joints.

SUMMARY

The present technology relates to apparatus and methods for repairing flawed or discrepant welds created between two workpieces. The workpieces can include, e.g., a polymeric composite. Other example materials are described below.

In a primary implementation, the discrepant weld is insufficient, and the repairing technique increases the size and/or robustness of an existing insufficient weld. The repair can include application of supplemental weld energy to the discrepant weld by way of a weld-energy applicator specially sized and shaped to deliver the energy as needed to cure the existing weld.

Benefits of the present technology include saving material and cost associated with conventional efforts such as scrapping flawed products, adding new welds, or adding one or more mechanical connections. Cycle time is also reduced by avoiding these efforts.

The resulting product is more robust, having a stronger joint between the workpieces.

Other aspects of the present invention will be in part apparent and in part pointed out hereinafter.

DESCRIPTION OF THE DRAWINGS

FIG. 1 illustrates schematically a conventional ultrasonic welding arrangement including a welding horn and two workpieces, separated by energy directors, prior to welding the pieces together.

FIG. 2 shows the arrangement of FIG. 1 as welding is commenced.

FIG. 3 shows the arrangement as welding is completed, and unwanted excessive, or squeeze-out, workpiece material formed, yielding a discrepant weld.

FIG. 7 shows the arrangement, like that of FIG. 3, showing the discrepant weld, indicating a first operation whereby the shoulder of the tooling, of FIG. 5, is lowered toward a proximate workpiece of the workpieces joined.

FIG. 8 shows the arrangement after the tooling is positioned per FIG. 7, and welding energy being applied via the tooling.

FIG. 9 shows the arrangement as final energy is being applied and the discrepant weld has just been repaired.

FIG. 10 shows the arrangement after the energy has been applied and the welding tooling is being withdrawn.

FIG. 11 shows a plan view of the resulting weld, not showing workpieces for simplicity of illustration.

FIG. 12 shows a close up of the view of a portion of FIG. 7, showing the discrepant weld, for referencing gaps around an ancillary weld portion of the discrepant weld.

DETAILED DESCRIPTION

Figure 13:
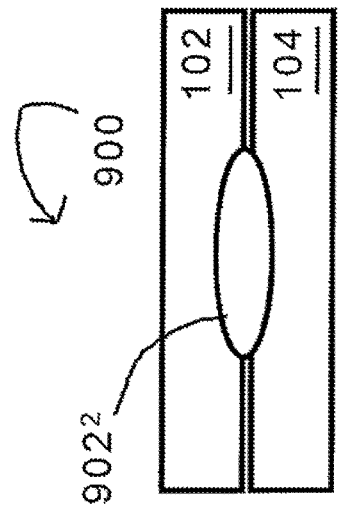
FIG. 13 shows view of the repaired product of FIG. 9, but with a combined-form of repaired weld.

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like.

Applications can be implemented on various system configurations, including single-processor or multiprocessor systems, microprocessor-based electronics, combinations thereof, and the like. In certain embodiments, some or all operations (e.g., controlling horn application) are performed by, or at least initiated by a computing device, such as a processor executing computer-executable instructions stored or included at a computer-readable medium. And any one or more steps of the process can be performed, initiated, or otherwise facilitated by automated machinery, such as robotics.

I. GENERAL OVERVIEW OF THE DISCLOSURE

An apparatus and methods for repairing flawed or discrepant welds, such an insufficient spot weld, created between two workpieces is described. Example workpiece materials are described below.

In situations in which a discrepant (e.g., insufficient) weld is formed, the repairing technique operates to increase the size, lack of the fusion, and/or robustness of the discrepant weld.

The repair can include application of supplemental weld energy to the discrepant weld by way of a weld-energy applicator specially sized and shaped to deliver the energy as needed to cure the existing weld. In one embodiment, the applicator is a generally donut-shaped horn—e.g., having a cylindrical void to form an annular application end, as described further below and shown in the figures (e.g., FIGS. 5 and 6). The repair tool may have other shapes, such as having a shoulder forming a generally oval, or elliptical, central void. In one embodiment, the void has a square bottom profile, or other rectangular bottom profile. In some embodiments, the void has other shapes, such as hexagonal, pentagonal, etc., or a shape having one or more straight lines and/or one or more curved lines.

In one embodiment, a general form of the discrepant weld—e.g., generally circular versus generally elongated oval—is determined, and an appropriate repair tool is used to repair it. In one embodiment, an appropriate repair tool, of multiple available distinctly-shaped repair tools, is selected for repairing the discrepant weld. As provided, any of these operations can be manual or automated. The determination, the selection, and the repair welding using the selected tool, for instance, can be manual or automated.

For instances in which ancillary, or squeeze-out, weld is present—e.g., weld portion 206 in FIG. 3—the ancillary weld acts as an energy director during the repair welding (shown schematically in FIGS. 8 and 9). The energy-director function of the ancillary weld 206 is described further below regarding FIGS. 8 and 9.

The ancillary weld 206, as effective energy director, promotes delivery of the weld energy to the point(s) at where the energy is needed—e.g., the area of the ancillary, or squeeze-out, weld.

The resulting product, including a new weld nugget surrounding the original central weld, and preferably merging with and enhancing the original weld (e.g., FIGS. 9, 10, and 11) is more robust, having a stronger joint between the workpieces.

By the present technology, material is saved, and cost reduced. Material and cost are reduced by, e.g., obviating conventional efforts such as scrapping flawed products, adding new welds, or adding one or more mechanical connections.

The system components, algorithm, and operations are described further below with reference to figures.

II. PROCESS, TOOLING, AND WORKPIECES—FIGS. 5-11

The present technology is now described with reference to example systems, tooling, and workpieces. The figures are referenced to facilitate understanding of the technology, and not to limit scope thereof.

Reference to directions herein, such as upper, lower, up, down, and lateral, are provided to facilitate description of the present technology but does not limit scope of the technology. A description in which a horn is described as descending down upon a proximate workpiece is not limited, for example, to the horn moving vertically downward in the earth, or environment, frame. The horn in this case can be moving from left to right, for example, in the environment frame.

Figure 5:
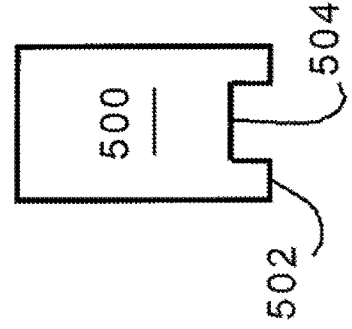
FIG. 5 illustrates schematically a cross-sectional view of a novel ultrasonic weld repair tool, according to an embodiment of the present technology.

Turning again to the figures, and more particularly, the fifth figure, FIG. 5 shows schematically a custom weld-repair tool 500 according to the present technology.

The repair tool 500 is introduced in response to determining that a discrepant weld is present. The determination can be made in any appropriate manner. In one embodiment, the determination is made using teachings of one or both of U.S. Pat. No. 8,839,247 and U.S. Pat. Appl. Publ. No. 2011/0108181, which are incorporated herein by reference.

Because the presence of a discrepant weld can be made during and/or immediately following discrepant-weld formation, the repair process can be commenced immediately thereafter, without need to relocate the workpieces. The repair tool 500 can be positioned adjacent or otherwise nearby the initial welding tool (e.g., horn 106). The tool 500 is arranged near the initial tool 106 so that it can be easily moved, to replace the initial tool, in position over the discrepant weld. The two tools 500, 106 can be mounted on a swivel or slide (not shown in detail) allowing the two to be interchanged. The arrangement is in one embodiment configured to be operated manually, in one embodiment by automated machinery, in one embodiment by both, and in one embodiment by either, selectively.

The custom weld-repair tool 500 includes extended portion(s) 502. The extended portion(s) 502 can be referred to by other names, such as shoulders, protrusions, extensions, etc. In one embodiment, the extended portion(s) 502 form one or more voids 504, or cavity, or recess.

In one embodiment the shoulder 502 is annular, defining a cylindrical cavity 504.

The custom weld-repair tool 500 is configured to direct welding energy—e.g., HF acoustic vibrations, to the insufficient weld 202 (FIG. 7) as needed to cure the weld—i.e., strengthen the weld from insufficient to robust and strong, as described further, below.

Figure 6:
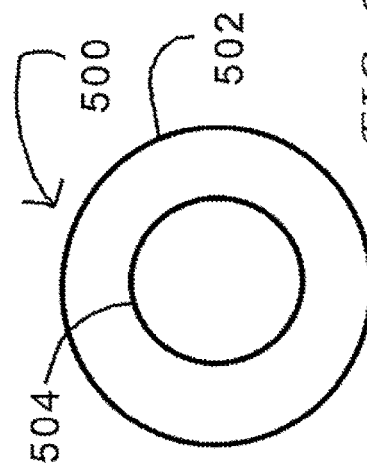
FIG. 6 shows a top plan view of the weld repair tool of FIG. 5.

FIG. 6 shows a bottom plan view of the custom weld-repair tool 500, including the shoulder 502 defining the central void 504.

FIG. 7 shows schematically the custom weld-repair tool 500 being lowered toward the proximate workpiece 102 of the workpieces 102, 104 joined by the discrepant weld 202.

The workpieces 102, 104 welded together can be similar or dissimilar. One or both pieces include a polymer, such as in the form of a polymeric composite, for instance. Example workpiece materials are described in greater detail further below.

Due to the shape of the tool 500, only the shoulder 502 of the tool 500 is brought into contact with the proximate workpiece 102.

In FIG. 8, with the tool 500 contacting the proximate workpiece 102 as described, a welding operation is commenced whereby welding energy 800—e.g., HF acoustic vibrations—is provided by way of the tool 500 to the proximate workpiece 102.

Further due to the shape of the tool 500, the welding energy is supplied to the proximate workpiece 102 only by way of the shoulder 502, as shown in FIG. 8.

As mentioned, in scenarios in which ancillary, or squeeze-out, weld is present—e.g., weld portion 206 in FIGS. 7 and 8—the ancillary weld acts as an energy director during the repair (shown schematically in FIGS. 8 and 9).

As provided, the ancillary weld 206, acting effectively as an energy director, promotes delivery of the weld energy 800 to the points at where the energy is needed—e.g., the area at and slightly adjacent the ancillary, or squeeze-out, weld 206. Ultrasonic energy is transmitted through squeeze-out (or loose-piece) 206, and the frictional heat from the interfaces and intermocular friction concentrates at the ancillary weld 206 resulting in a rapid buildup of heat, which causes the squeeze-out to melt.

In further explanation, the energy-director function of the ancillary weld 206 is promoted by the usual form of ancillary welds, wherein there are spaces, or gaps, adjacent the weld material. Example gaps are shown in FIG. 12, being a close-up view of a portion of FIG. 7. The gaps are indicated by reference numerals 1200 in the figure. While the gaps 1200 are called out expressly only on the left of the figure, for simplicity, they are present on both sides of the arrangement, including along peripheries of the ancillary weld 206, as shown.

The gaps promote generation of heat around the energy-director acting ancillary weld 206, allowing the ultrasonic vibrations to focus in the weld and/or workpiece material directly adjacent the gap, causing heating, and melting of this weld and/or workpiece material directly adjacent the gap.

As the weld energy 800 (e.g., HF acoustic vibrations) is applied, as shown in FIG. 8, due to the custom weld-repair tool 500 design (e.g., shoulders) and the ancillary weld 206 acting as an energy director, the energy 800 transfers predominantly, if not completely, to pass through the ancillary weld 206.

As a result, the weld 206 begins to melt. The activity will also cause material of one or both workpieces, being adjacent the weld and not previously melted, to be heated and melt. Material of the primary weld 204, and workpiece material adjacent the weld, also become heated and can melt to a degree based in part on the amount of energy being applied. The resulting product includes a larger ancillary weld that is between the pieces 102, 104 and joined to, or joined more robustly to, the primary weld, which may also be larger or more robust.

As provided, in one scenario, it is desired to have welds measuring about 7 mm, or more, in width. Using the present technique, resulting welds measuring 7 mm, or more, can be achieved by repairing discrepant welds having widths anywhere between about 0 mm and about 4 mm.

FIG. 9 shows the resulting product 900 including a first form of repaired weld $902^1$. The repaired weld $902^1$ includes a larger ancillary weld 906, between the pieces 102, 104, and joined to, or joined more robustly to, a larger primary weld 904, also joining the pieces 102, 104.

Figure 14:
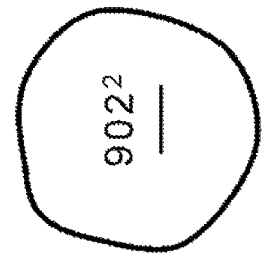
FIG. 14 shows a top plan view of the repaired weld of FIG. 13.
Figure 4:
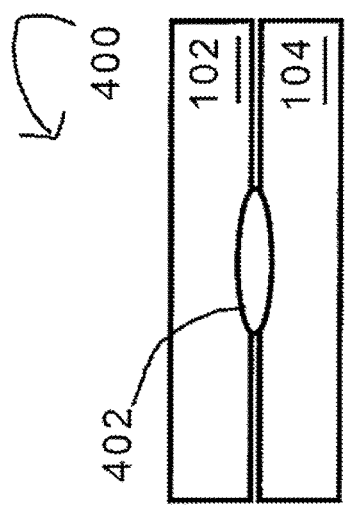
FIG. 4 shows the arrangement of FIG. 1 after a preferred welding, resulting in the illustrated complete weld.

As provided, the primary and/or ancillary weld portions 904, 906 can develop during the repair welding so that the two are connected, or melded, together. When substantially connected, the primary and ancillary weld portions can combine into a single repaired weld $902^2$, as shown in FIGS. 13 and 14. Notably, the first repaired weld $902^1$ and the second repaired weld $902^2$, formed using the present technology, are more robust and larger than the discrepant weld (e.g., 202 in FIGS. 2 and 3) that was repaired. The first repaired weld 902 1 and the second repaired weld $902^2$, formed using the present technology, could also be more robust and larger than welds formed initially without discrepancy—e.g., weld 402 of FIG. 4.

The present technique can also be used, generally, even in scenarios in which the initially-insufficient ancillary weld 206 is miniscule or even non-existent. In these cases, the custom-shaped tool 500 still directs vibrations, and so frictional heat, toward a peripheral area at and/or adjacent the initial, insufficient, primary weld 204. This initial friction heat will enhance the intermocular friction in the polymeric composite.

As a result, any initial ancillary weld 206 is enlarged (e.g., 906 in FIG. 9). If there is no ancillary weld initially, either one is formed by the energy 800 emanating (FIG. 8) from the shoulders 502 of the custom tool 500, the primary weld 204 is enlarged (e.g., 904 in FIG. 9) at and/or adjacent the initial primary weld 204, or both, whereby the ancillary weld (e.g., 906 in FIG. 9) formed as such becomes, preferably, connected to the enlarged primary weld (e.g., 904 in FIG. 9).

As provided, the workpieces 102, 104 being welded together can be similar or dissimilar. Regarding dissimilar workpiece materials, one workpiece can be a plastic or other polymer, for instance, and the other can be steel, aluminum, an alloy, or other metal, etc. Thus, the teachings of the present disclosure can be used to join a polymer (e.g., polymeric composite) to another polymer, or to join a polymer to a metal, for instance.

In one embodiment, the material of the pieces 102, 104 includes polyethylene. In one embodiment, the material includes polyethylene terephthalate (PET), high density polyethylene (HDPE) and/or ethylene vinyl alcohol (EVOH).

In one embodiment, at least one of the workpieces 101 being joined includes a polymer. At least one of the workpieces 102, 104 can include synthetic, or inorganic, molecules. While use of so-called biopolymers (or, green polymers) is increasing, petroleum based polymers are still much more common.

Material of one or both workpieces 102, 104 may also include recycled material, such as a polybutylene terephthalate (PBT) polymer, which is about eighty-five percent post-consumer polyethylene terephthalate (PET).

In one embodiment one or both of the workpieces 102, 104 includes some sort of plastic. In one embodiment, the material includes a thermo-plastic.

In one embodiment one or both of the workpieces 102, 104 includes a composite. For example, in one embodiment one or both of the workpieces includes a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite.

The material 102, 104 in some implementations includes a polyamide-grade polymer, which can be referred to generally as a polyamide.

Material of one or both workpieces 102, 104 may also include includes polyvinyl chloride (PVC).

In one embodiment, the material 102, 104 includes acrylonitrile-butadiene-styrene (ABS).

In one embodiment, the material 102, 104 includes a polycarbonate (PC).

Material of one or both workpieces 102, 104 may also comprise a type of resin. Example resins include a fiberglass polypropylene (PP) resin, a PC/PBT resin, and a PC/ABS resin.

The workpieces 102, 104 may be pre-processed, such as heated and compression molded prior to the welding.

As mentioned, and any of the operations can be performed, initiated, or otherwise facilitated by automated machinery, such as robotics. A robot (not shown in detail) can be configured and arranged (e.g., connected to the custom weld-repair tool 500) to control the lowering of the weld-repair 500. The robot can be automated or controlled by automation embodied in, e.g., a computer or other electronic controller (not shown).

The controller, in one embodiment, includes a tangible computer readable storage device, or memory. The memory is programmed with (i.e., stores) computer-executable instructions, or code, that, when executed by a processor, such as a processor of the controller, causes the processor to initiate and control motion of the weld-repair tool 500.

The controller can control a downward movement of the tool 500, a total distance, or displacement, of the movement, and a velocity, or rate of displacement and direction (e.g., down or up).

In one embodiment, the horn 500 is configured (e.g., by weight or spring load) and/or controlled to apply a downward force on the workpieces 102, 104 during the welding. In some embodiments, a counter, upward force is provided by the system as well, such as by a static support or anvil, or upward pressure (not shown in detail). This scenario creates a compression that promotes connection between the workpieces as the weld energy (e.g., HF vibrations) is transmitted through the pieces 102, 104.

FIG. 10 shows the resulting repaired product 900 and the custom weld-repair tool 500 being withdrawn—e.g., raised upward and away from the repaired product 900. As this is happening, and once application of the energy 800 (FIG. 8) is ceased, the product 900, and especially the new, repaired, weld begins to cool and harden, solidifying the repaired weld.

FIG. 11 shows the repaired weld 902 including the enlarged primary weld 904 and the enlarged, or relatively-large newly formed, ancillary weld 906.

III. VARIOUS FEATURES OF THE TECHNOLOGY

Many but not all features, motivations, benefits and advantages related to the present technology are described above and some but not all read described in this section.

Benefits of the present technology include saving material and cost associated with conventional efforts.

Cycle time and processing cost (electricity, robotic operations, etc.) is reduced, for instance, as time is not needed to determine how many new welds to create, and where, and to create such welds.

Cycle time and processing cost (electricity, robotic operations, etc.) can also be improved by avoiding operations of scrapping flawed products.

Timing and cost are further improved by not having to add one or more mechanical connections, as is another contemplated repair technique. Cosmetic quality is also improved, or maintained, by avoiding mechanical connections (e.g., staples).

As another benefit, the resulting product is more robust, having a stronger joint between the workpieces.

The benefits make welding in an assembling environment much more cost effective and results in lightweight products (e.g., vehicle components and entire vehicle) having stronger, more robust, joints.

IV. CONCLUSION

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. A method, for repairing a weld, the method comprising:
   providing a first weld-repair tool comprising an extended portion and a cavity adjacent the extended portion,
   providing at least partially joined workpieces, wherein at least one workpiece contains a polymer material, the workpieces being joined by a discrepant weld comprising an insufficient primary portion and an ancillary portion positioned at a periphery of the insufficient primary portion or directly adjacent the insufficient primary portion;
   positioning the first weld-repair tool and the workpieces so that the extended portion of the first weld-repair tool contacts a proximate workpiece of the workpieces, and the cavity aligns generally with the ancillary portion; and
   delivering welding energy from the first weld-repair tool, via the extended portion, to the proximate workpiece in contact with the first weld-repair tool, causing the energy to melt the ancillary portion thus forming an enlarged ancillary portion that adjoins the insufficient primary portion and repairing the discrepant weld.

2. The method of claim 1, wherein delivering the welding energy comprises channeling the energy to the proximate workpieces to form the enlarged ancillary portion.

3. The method of claim 1, wherein air gaps adjacent the ancillary portion promote the ancillary portion acting as an energy director.

4. The method of claim 3, wherein delivering the welding energy comprises channeling the energy to the proximate workpiece to enlarge the insufficient primary portion, yielding an enlarged primary portion.

5. The method of claim 1, wherein delivering the welding energy comprises channeling the energy to the proximate workpiece to substantially connect the enlarged ancillary portion and the insufficient primary portion, yielding a single repaired weld.

6. The method of claim 1, wherein the ancillary portion acts as an energy director during the welding, further focusing the welding energy toward an area of the ancillary portion for repairing the discrepant weld.

7. The method of claim 1, further comprising a tool arrangement comprising the first weld-repair tool and a second weld-repair tool having a shape different from the first weld-repair tool, wherein:
   the first weld-repair tool is configured to repair a first type of discrepant weld; and
   the second weld-repair tool is configured to repair a second type of discrepant weld different from the first type of discrepant weld.

8. A method, for repairing a weld, the method comprising:
   providing at least partially joined workpieces, wherein at least one workpiece contains a polymer material, the workpieces being joined by a discrepant weld comprising an insufficient primary portion (204) and an ancillary portion (206) positioned at a periphery of the insufficient primary portion or directly adjacent the insufficient primary portion;
   determining a general form of the discrepant weld;
   selecting, based on the determined form, a weld-repair tool from a tooling arrangement comprising a first weld-repair tool having an extended portion and a cavity adjacent the extended portion and a second weld-repair tool having a shape different from the first weld-repair tool,
   positioning the selected weld-repair tool and the workpieces such that at least a portion of the selected weld-repair tool contacts a proximate workpiece and aligns at or near a periphery of the ancillary portion; and
   delivering welding energy from the selected weld-repair tool, via the portion in contact with the proximate workpiece, causing the energy to melt the ancillary portion thus forming an enlarged ancillary portion that adjoins the insufficient primary portion.

9. The method of claim 8, further comprising:
   determining that an initial weld is apparently discrepant;
   wherein the positioning and delivering are performed in response to identification of the initial weld as discrepant.

10. The method of claim 8, wherein delivering the welding energy comprises channeling the energy to the proximate workpieces to form the enlarged ancillary portion.

11. The method of claim 8, wherein air gaps adjacent the ancillary portion promote the ancillary portion acting as an energy director.

12. The method of claim 11, wherein delivering the welding energy comprises channeling the energy to the proximate workpiece to enlarge the insufficient primary portion, yielding an enlarged primary portion.

13. The method of claim 8, wherein delivering the welding energy comprises channeling the energy to the proximate workpiece to substantially connect the enlarged ancillary portion and the insufficient primary portion, yielding a single repaired weld.

14. The method of claim 8, wherein the ancillary portion acts as an energy director during the welding, further focusing the welding energy.

15. The method of claim 8, wherein:
the first weld-repair tool is configured to repair a first type of discrepant weld; and
the second weld-repair tool is configured to repair a second type of discrepant weld different from the first type of discrepant weld.

\* \* \* \* \*